(12) United States Patent
Varkey et al.

(10) Patent No.: US 9,412,492 B2
(45) Date of Patent: Aug. 9, 2016

(54) TORQUE-BALANCED, GAS-SEALED WIRELINE CABLES

(75) Inventors: Joseph Varkey, Sugar Land, TX (US); Sheng Chang, Sugar Land, TX (US); Byong Jun Kim, Los Altos, CA (US); Jushik Yun, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 483 days.

(21) Appl. No.: 12/425,439

(22) Filed: Apr. 17, 2009

(65) Prior Publication Data

US 2010/0263904 A1 Oct. 21, 2010

(51) Int. Cl.
| | | |
|---|---|---|
| H01B 9/02 | (2006.01) | |
| H01B 7/04 | (2006.01) | |
| H01B 7/285 | (2006.01) | |

(52) U.S. Cl.
CPC ............... *H01B 7/046* (2013.01); *H01B 7/285* (2013.01); *Y10T 29/49117* (2015.01)

(58) Field of Classification Search
CPC .................................. H01B 7/22; H01B 7/226
USPC ............................................. 174/106 R, 108
See application file for complete search history.

(56) References Cited

U.S. PATENT DOCUMENTS

| | | | |
|---|---|---|---|
| 1,948,439 A | | 2/1934 | Budscheid |
| 2,576,227 A | | 11/1951 | Hutchins, Jr. |
| 2,604,509 A | * | 7/1952 | Blanchard ............... 174/108 |
| 3,115,542 A | | 12/1963 | Giuseppe et al. |
| 3,127,083 A | | 3/1964 | Guyer |
| 3,217,083 A | | 11/1965 | Gore |
| 3,313,346 A | | 4/1967 | Cross |
| 3,328,140 A | | 6/1967 | Warren |
| 3,346,045 A | | 10/1967 | Knapp et al. |
| 3,482,034 A | | 12/1969 | Rhoades et al. |
| 3,490,125 A | | 1/1970 | Frieling, Jr. |

(Continued)

FOREIGN PATENT DOCUMENTS

| | | |
|---|---|---|
| EP | 0003104 A1 | 7/1979 |
| EP | 0003104 B1 | 10/1981 |

(Continued)

OTHER PUBLICATIONS

Patent Examination Report No. 1 issued in AU2010236397 on Apr. 22, 2015, 15 pages.
Extended European Search Report issued in EP10765176.2 on Mar. 23, 2015, 7 pages.
Salama, et al., "Instructional design of multi-layer insulation of power cable", Feb. 1992, Power Systems, IEEE Transactions, vol. 7, No. 1, pp. 377-382.

(Continued)

*Primary Examiner* — Chau N Nguyen
(74) *Attorney, Agent, or Firm* — Trevor G. Grove (57) ABSTRACT

A torque-balanced, gas-blocking wireline cable and a method of making the cable includes an electrically conductive cable core for transmitting electrical power and surrounding inner and outer layers of a plurality of armor wires. Gas blocking is achieved by placing a soft polymer layer over the core before the inner wires are cabled thereon. The inner wires imbed partially into the soft polymer layer such that no gaps are left between the inner wires and the core. A second soft polymer layer is optionally extruded over the inner wires before the outer wires are applied. The second soft polymer layer fills any spaces between the inner and outer wire layers and prevents pressurized gas from infiltrating between the wires. The inner wires have larger diameters than the outer wires such that the inner wires carry approximately 60% of the load and torque imbalance is prevented.

13 Claims, 5 Drawing Sheets

(56) References Cited

U.S. PATENT DOCUMENTS

| | | |
|---|---|---|
| 3,634,607 A | 1/1972 | Coleman |
| 3,679,812 A | 7/1972 | Owens |
| 3,681,514 A | 8/1972 | Rhoades et al. |
| 3,710,859 A | 1/1973 | Hanes et al. |
| 3,758,704 A | 9/1973 | Naud |
| 3,766,307 A | 10/1973 | Andrews |
| 4,016,942 A | 4/1977 | Wallis et al. |
| 4,059,951 A | 11/1977 | Roe |
| 4,077,022 A | 2/1978 | Pitts et al. |
| 4,131,757 A | 12/1978 | Felkel |
| 4,131,758 A | 12/1978 | Felkel |
| 4,197,423 A | 4/1980 | Fusen |
| 4,250,351 A | 2/1981 | Bridges |
| 4,259,544 A | 3/1981 | Litauer et al. |
| 4,281,716 A | 8/1981 | Hall |
| 4,292,588 A | 9/1981 | Smith |
| 4,409,431 A | 10/1983 | Neuroth |
| 4,486,252 A | 12/1984 | Lloyd |
| 4,522,464 A | 6/1985 | Thompson et al. |
| 4,523,804 A | 6/1985 | Thompson |
| 4,525,813 A | 6/1985 | Burrage |
| 4,547,774 A * | 10/1985 | Gould ............... 340/854.7 |
| 4,577,693 A | 3/1986 | Graser |
| 4,606,604 A * | 8/1986 | Soodak ............... 385/113 |
| 4,644,094 A | 2/1987 | Hoffman |
| 4,645,298 A | 2/1987 | Gartside |
| 4,673,041 A | 6/1987 | Turner et al. |
| 4,675,474 A | 6/1987 | Neuroth |
| 4,696,542 A * | 9/1987 | Thompson ............... 385/108 |
| 4,722,589 A | 2/1988 | Priaroggia |
| 4,743,711 A | 5/1988 | Hoffman |
| 4,762,180 A | 8/1988 | Wybro et al. |
| 4,768,984 A | 9/1988 | de Oliveira et al. |
| 4,825,953 A | 5/1989 | Wong et al. |
| 4,830,113 A | 5/1989 | Geyer |
| 4,899,823 A | 2/1990 | Cobb et al. |
| 4,952,012 A | 8/1990 | Stamnitz |
| 4,979,795 A | 12/1990 | Mascarenhas |
| 4,986,360 A | 1/1991 | Laky et al. |
| 4,993,492 A | 2/1991 | Cressey et al. |
| 5,002,130 A | 3/1991 | Laky |
| 5,088,559 A | 2/1992 | Taliaferro |
| 5,125,061 A | 6/1992 | Marlier et al. |
| 5,125,062 A | 6/1992 | Marlier et al. |
| 5,150,443 A | 9/1992 | Wijnberg |
| 5,329,605 A | 7/1994 | Wargotz |
| 5,339,378 A | 8/1994 | Simonds et al. |
| 5,431,759 A | 7/1995 | Neuroth |
| 5,495,547 A | 2/1996 | Rafie et al. |
| 5,778,981 A | 7/1998 | Head |
| 5,787,217 A | 7/1998 | Traut et al. |
| 5,857,523 A | 1/1999 | Edwards |
| 5,894,104 A | 4/1999 | Hedberg |
| 6,015,013 A | 1/2000 | Edwards et al. |
| 6,030,255 A | 2/2000 | Konishi et al. |
| 6,053,252 A | 4/2000 | Edwards |
| 6,060,662 A | 5/2000 | Rafie et al. |
| 6,116,345 A | 9/2000 | Fontana et al. |
| 6,161,619 A | 12/2000 | Head |
| 6,182,765 B1 | 2/2001 | Kilgore |
| 6,195,487 B1 | 2/2001 | Anderson et al. |
| 6,211,467 B1 | 4/2001 | Berelsman et al. |
| 6,276,456 B1 | 8/2001 | Head |
| 6,386,290 B1 | 5/2002 | Headworth |
| 6,403,889 B1 | 6/2002 | Mehan et al. |
| 6,442,304 B1 | 8/2002 | Crawley et al. |
| 6,484,806 B2 | 11/2002 | Childers et al. |
| 6,488,093 B2 | 12/2002 | Moss |
| 6,555,752 B2 | 4/2003 | Dalrymple et al. |
| 6,559,383 B1 | 5/2003 | Martin |
| 6,559,385 B1 | 5/2003 | Johnson et al. |
| 6,600,108 B1 | 7/2003 | Mydur et al. |
| 6,631,095 B1 | 10/2003 | Bryant et al. |
| 6,659,180 B2 | 12/2003 | Moss |
| 6,675,888 B2 | 1/2004 | Schempf et al. |
| 6,691,775 B2 | 2/2004 | Headworth |
| 6,745,840 B2 | 6/2004 | Headworth |
| 6,747,213 B2 | 6/2004 | Bonicel |
| 6,763,889 B2 | 7/2004 | Rytlewski et al. |
| 6,776,195 B2 | 8/2004 | Blasko et al. |
| 6,807,988 B2 | 10/2004 | Powell et al. |
| 6,834,724 B2 | 12/2004 | Headworth |
| 6,843,321 B2 | 1/2005 | Carlsen |
| 6,919,512 B2 | 7/2005 | Guven et al. |
| 7,000,903 B2 | 2/2006 | Piecyk et al. |
| 7,116,283 B2 | 10/2006 | Benson et al. |
| 7,119,283 B1 | 10/2006 | Varkey et al. |
| 7,139,218 B2 | 11/2006 | Hall et al. |
| 7,170,007 B2 | 1/2007 | Varkey et al. |
| 7,188,406 B2 * | 3/2007 | Varkey et al. ............... 29/825 |
| 7,235,743 B2 | 6/2007 | Varkey |
| 7,282,644 B1 | 10/2007 | Alvey |
| 7,326,854 B2 | 2/2008 | Varkey |
| 7,331,393 B1 | 2/2008 | Hoel |
| 7,402,753 B2 | 7/2008 | Varkey et al. |
| 7,462,781 B2 | 12/2008 | Varkey et al. |
| 7,465,876 B2 | 12/2008 | Varkey |
| 7,586,042 B2 | 9/2009 | Varkey et al. |
| 7,700,880 B2 | 4/2010 | Varkey et al. |
| 7,719,283 B2 | 5/2010 | Ishikawa et al. |
| 7,730,936 B2 | 6/2010 | Hernandez-Solis et al. |
| 7,798,234 B2 | 9/2010 | Ju et al. |
| 7,845,412 B2 | 12/2010 | Sbordone et al. |
| 8,011,435 B2 | 9/2011 | Carossino et al. |
| 8,227,697 B2 | 7/2012 | Varkey et al. |
| 8,387,701 B2 | 3/2013 | Sbordone |
| 8,413,723 B2 | 4/2013 | Varkey et al. |
| 8,807,225 B2 | 8/2014 | Varkey et al. |
| 9,027,657 B2 | 5/2015 | Varkey |
| 2003/0011489 A1 | 1/2003 | Viswanathan |
| 2003/0163179 A1 | 8/2003 | Hoglund et al. |
| 2004/0163822 A1 | 8/2004 | Zhang et al. |
| 2004/0262027 A1 | 12/2004 | Kaczmarski |
| 2005/0217844 A1 | 10/2005 | Edwards et al. |
| 2005/0219063 A1 | 10/2005 | Viswanathan et al. |
| 2006/0151194 A1 | 7/2006 | Varkey et al. |
| 2006/0187084 A1 | 8/2006 | Hernandez-Marti et al. |
| 2006/0221768 A1 | 10/2006 | Hall et al. |
| 2006/0242824 A1 | 11/2006 | Varkey et al. |
| 2007/0000682 A1 | 1/2007 | Varkey et al. |
| 2007/0003780 A1 | 1/2007 | Varkey et al. |
| 2007/0044991 A1 | 3/2007 | Varkey |
| 2007/0158095 A1 | 7/2007 | Sridhar et al. |
| 2008/0083533 A1 | 4/2008 | Malone et al. |
| 2008/0156517 A1 | 7/2008 | Varkey et al. |
| 2008/0190612 A1 | 8/2008 | Buchanan |
| 2009/0194296 A1 | 8/2009 | Gillan et al. |
| 2010/0038112 A1 * | 2/2010 | Grether ............... 174/128.1 |
| 2010/0263904 A1 | 10/2010 | Varkey et al. |
| 2012/0222869 A1 | 9/2012 | Varkey |
| 2014/0352952 A1 | 12/2014 | Varkey et al. |

FOREIGN PATENT DOCUMENTS

| | | |
|---|---|---|
| EP | 0471600 A1 | 2/1992 |
| EP | 0471600 B1 | 3/1996 |
| EP | 1216342 A0 | 6/2002 |
| EP | 1216342 B1 | 12/2005 |
| EP | 2039878 A1 | 3/2009 |
| EP | 2039878 B1 | 8/2010 |
| FR | 2767861 A1 | 3/1999 |
| GB | 2234772 A | 2/1991 |
| JP | 54007186 A | 1/1979 |
| JP | 02216710 A | 8/1990 |
| WO | 9948111 A1 | 9/1999 |
| WO | 0125593 A1 | 4/2001 |
| WO | 02071178 A2 | 9/2002 |
| WO | 2006003362 A1 | 1/2006 |
| WO | 2006027553 A1 | 3/2006 |

(56) References Cited

FOREIGN PATENT DOCUMENTS

| WO | 2006088372 A1 | 8/2006 |
| WO | 2007034242 A1 | 3/2007 |
| WO | 2011037974 A2 | 3/2011 |

OTHER PUBLICATIONS

Lebedev, et al., "The breakdown strength of two-layer dielectrics", Aug. 1999, High Voltage Engineering, Eleventh International Symposium, Conf. Publ. No. 467, vol. 4, pp. 304-307.

* cited by examiner

TORQUE-BALANCED, GAS-SEALED WIRELINE CABLES

BACKGROUND

The statements in this section merely provide background information related to the present disclosure and may not constitute prior art.

The present disclosure relates generally to oilfield cables and, in particular, to wireline cables, and methods of making and using such cables.

Several common problems encountered with wireline cables used in oilfield operations are related to armor wire strength members. Armor wire is typically constructed of cold-drawn plow ferritic steel coated with a zinc coating for corrosion protection. These armor wires provide the strength needed to raise and lower the weight of the cable and tool string and protect the cable core from impact and abrasion damage. Typical wireline cable designs consist of a cable core of one or more insulated conductors (packed in an interstitial filler in the case of multiple conductors) wrapped in cabling tape followed by the application of two armor wire layers. The armor wire layers are applied counterhelically to one another in an effort to minimize torque imbalance between the layers. In an effort to provide additional protection against impact, cut through, and abrasion damage, larger-diameter armor wires are typically placed in the outer layer. Due to shortcomings in these designs, torque imbalance between the armor wire layers continues to be an issue, resulting in cable stretch, cable core deformation and significant reductions in cable strength.

In pressurized wells, gas can infiltrate through gaps between the armor wires and travel along spaces existing between the inner armor wire layer and the cable core. Grease-filled pipes at the well surface provide a seal at the well surface. As the wireline cable passes through these pipes, pressurized gas can travel through the spaces among armor wires and the cable core. When the cable then passes over and bends over a sheave, the gas is released, resulting in an explosion and fire hazard.

Figure 1:
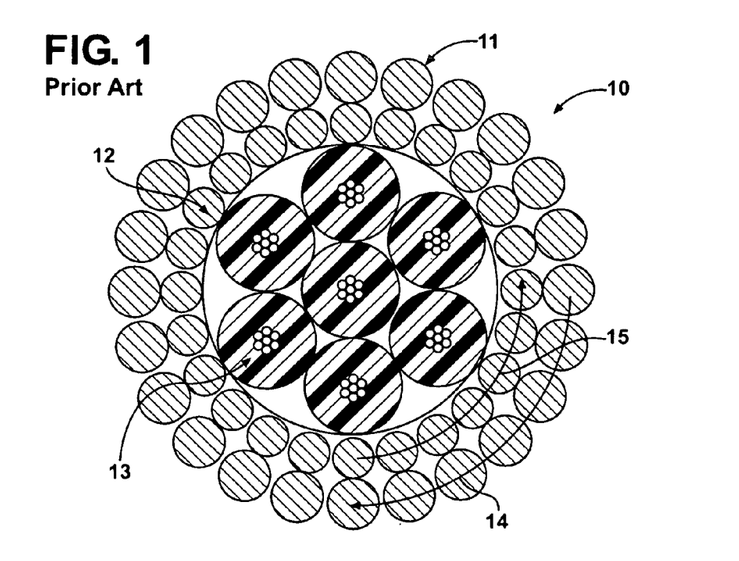
FIG. 1 is a radial cross-sectional view of a prior art wireline cable.

In typical wireline cable designs, such as a wireline cable 10 shown in FIG. 1, outer armor wires 11 were sized larger than inner armor wires 12 in an effort to provide greater protection against impact, cut-through, and abrasion damage. One unintended effect of this design strategy is to increase torque imbalance. In those designs, the outer armor wires 11 carry roughly 60% of the load placed on the cable. This causes the outer armor wires 11 to straighten slightly when the cable is under tension, which in turn causes the cable core 13 to stretch and the inner armor wires 12 to be wound more tightly around the cable core. The outer armor wires 11 and inner armor wires 12 may come into point-to-point contact which wears away the protective zinc layer leading to premature corrosion. The cable core 13 can also be damaged as it deforms into the interstitial spaces between the inner armor wires 12. Additionally, because the outer armor wires 11 are carrying the bulk of the load, they are more susceptible to breaking if damaged, thereby largely negating any benefits of placing the larger armor wires in the outer layer.

Under tension, the inner and outer armor wires (which are applied at opposite lay angles) tend to rotate in opposite directions as shown by arrows 14 and 15 respectively as shown in FIG. 1. Because the larger outer armor wires 11 are dominant, the outer armor wires tend to open, while the inner armor wires 12 tighten, causing torque imbalance problems. To create a torque-balanced cable, the inner armor wires would have to be somewhat larger than the outer armor wires. This configuration has been avoided in standard wireline cables in the belief that the smaller outer wires would quickly fail due to abrasion and exposure to corrosive fluids. Therefore, larger armor wires have been placed at the outside of the wireline cable, which increases the likelihood and severity of torque imbalance.

Torque for a layer of armor wire can be described in the following equation.

$$\text{Torque} = \tfrac{1}{4} T \times PD \times \sin 2\alpha$$

Where: T=Tension along the direction of the cable; PD=Pitch diameter of the armor wires; and $\alpha$=Lay angle of the wires.

Pitch diameter (the diameter at which the armor wires are applied around the cable core or the previous armor wire layer) has a direct effect on the amount of torque carried by that armor wire layer. When layers of armor wire constrict due to cable stretch, the diameter of each layer is reduced numerically the same. Because this reduction in diameter is a greater percentage for the inner layer of armor wires 12, this has a net effect of shifting a greater amount of the torque to the outer layer of armor wires 11.

Figure 2:
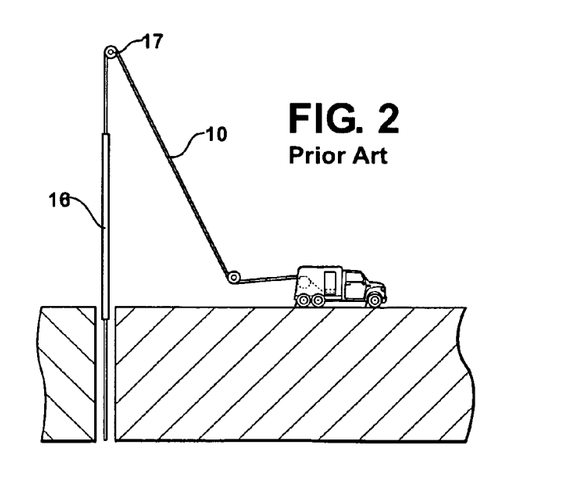
FIG. 2 is a schematic cross-sectional view of the prior art wireline cable shown in FIG. 1 in use.
Figure 3:
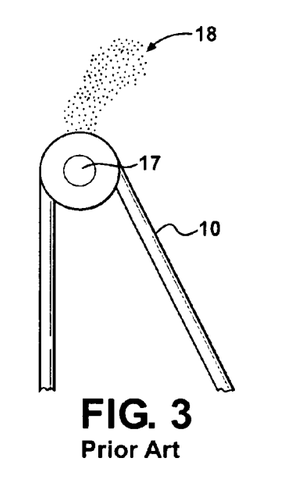
FIG. 3 is an enlarged view of the prior art wireline cable and the upper sheave shown in FIG. 2.

In high-pressure wells, the wireline 10 is run through one or several lengths of piping 16 packed with grease to seal the gas pressure in the well while allowing the wireline to travel in and out of the well (see FIG. 2). Armor wire layers have unfilled annular gaps between the armor wire layers and the cable core. Under well conditions, well debris and the grease used in the risers can form a seal over the armor wires, allowing pressurized gas to travel along the cable core beneath the armor wires. Pressurized gas from the well can infiltrate through spaces between the armor wires and travel upward along the gaps between the armor wires and the cable core upward toward lower pressure. Given cable tension and the sealing effects of grease from the risers and downhole debris coating the armor wire layers, this gas tends to be held in place as the wireline travels through the grease-packed risers. As the wireline 10 bends when passing over the upper sheave 17 (located above the risers), the armor wires tend to spread apart slightly and the pressurized gas 18 is released. This released gas 18 becomes an explosion hazard (see FIG. 3).

It is desirable, therefore, to provide a cable that overcomes the problems encountered with wireline cable designs.

The disclosed designs minimize the problems described above by:

Placing layers of soft polymer between the inner armor wires and the cable core and between the inner and outer armor wire layers; and Using larger-diameter armor wires for the inner layer than for the outer layer.

The polymeric layers provide several benefits, including:

Eliminating the space along the cable core and the first layer of armor along which pressurized gas might travel to escape the well;

Eliminating the space into which the cable core might creep and deform against the inner armor wires;

Cushioning contact points between the inner and outer armor wires to minimize damage from armor wires rubbing against each other;

Filling space into which the inner armor wire might otherwise be compressed, thereby minimizing cable stretch; and Filling space into which the inner armor wire might otherwise be compressed, thereby minimizing the above-described effect of shifting torque to the outer armor wire layer when the diameters of both the inner and outer armor wire layers are decreased by the same amount.

Torque balance is achieved between the inner and outer armor wire layers by placing larger wires in the inner layer. As explained below, this allows the majority of the load to be carried by the inner armor wires. While in traditional armor wire configurations, the outer wires ended up carrying approximately 60 percent of the load and the inner wires approximately 40 percent. By placing the larger armor wires in the inner layer, the proportions of load can be more or less reversed, depending on individual cable design specifications.

The designs place soft thermoplastic polymer layers over the cable core and between the inner and outer armor wire layers and reconfigure the sizes of armor wires used such that larger armor wires are placed in the inner layer. As an option, these designs may utilize solid armor wires in the inner layer and stranded armor wires in the outer layer. These design changes result in a more truly torque-balanced cable that is sealed against intrusion and travel of pressurized gas. These designs may also have an outer layer of polymer to create a better seal at the well surface.

SUMMARY

An embodiment of a cable includes: an electrically conductive cable core for transmitting electrical power; a first layer of polymer material surrounding said cable core; an inner layer of a plurality of first armor wires surrounding said cable core, said first armor wires being imbedded in said first layer to prevent gaps between said first armor wires and said cable core; and an outer layer of a plurality of second armor wires surrounding said inner layer, said second armor wires having a smaller diameter than a diameter of said first armor wires for preventing torque imbalance in the cable.

Another embodiment of a cable includes: an electrically conductive cable core for transmitting electrical power; a first layer of polymer material surrounding said cable core; an inner layer of a plurality of first armor wires surrounding said cable core, said first armor wires being imbedded in said first layer to prevent gaps between said first armor wires and said cable core; a second layer of polymer material surrounding said inner layer; and an outer layer of a plurality of second armor wires surrounding said second layer, said second layer preventing gaps between said first armor wires and said second armor wires, said second armor wires having a smaller diameter than a diameter of said first armor wires for preventing torque imbalance in the cable. The first armor wires can carry approximately 60% of a load applied to the cable. The cable can include a third layer of polymer material surrounding said outer layer. The second armor wires can be stranded wires. The polymer materials of said first and second layers can be formed from at least one of: a polyolefin or olefin-base elastomer material; a thermoplastic vulcanizate material; a silicone rubber; an acrylate rubber; a soft engineering plastic; a soft fluoropolymer material; a fluoroelastomer material; and a thermoplastic fluoropolymer material. The cable core can include another polymer material having a higher melting point than a melting point of said polymer materials of said first and second layers.

A method of forming a cable includes: providing an electrically conductive cable core for transmitting electrical power; surrounding the cable core with a first layer of polymer material; providing a plurality of first armor wires and winding the first armor wires around the first layer to form an inner layer of the first armor wires imbedded in the first layer to prevent gaps between the first armor wires and the cable core; and providing a plurality of second armor wires and winding the second armor wires around the inner layer to form an outer layer of the second armor wires, said second armor wires having a smaller diameter than a diameter of said first armor wires for preventing torque imbalance in the cable.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

Illustrative embodiments of the invention are described below. In the interest of clarity, not all features of an actual implementation are described in this specification. It will of course be appreciated that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The present invention relates to a wireline cable that utilizes soft polymers as interstitial fillers beneath and between the armor wire layers, which soft polymers may be any suitable material, including but not limited to the following: polyolefin or olefin-base elastomer (such as Engage®, Infuse®, etc.); thermoplastic vulcanizates (TPVs) such as Santoprene® and Super TPVs and fluoro TPV (F-TPV); silicone rubber; acrylate rubber; soft engineering plastics (such as soft modified polypropylene sulfide [PPS] or modified Poly-ether-ether-ketone [PEEK]); soft fluoropolymer (such as high-melt flow ETFE (ethylene-tetrafluoroethylene) fluoropolymer; fluoroelastomer (such as DAI-EL™ manufactured by Daikin); and thermoplastic fluoropolymers.

The above polymers can be also used with various additives to meet the mechanical requirement.

Armor wire strength members may be any suitable material typically used for armor wires, such as: galvanized improved plow steel (with a variety of strength ratings); highcarbon steel; and 27-7 Molybdenum. These may be used as solid armors or stranded members.

Low-temperature polymers may be used for the polymeric jacketing layers to enable the armoring process to be stopped without damaging the cable core. This strategy, as discussed below, requires that the "low-temperature" polymers have process temperatures 25° F. to 50° F. below those used in the cable core. Possible jacketing materials include: polyolefin-base and acrylate-base polymers with process temperatures in ranging from 300° F. to 450° F.; and fluoropolymer with lower melting point.

The core polymers are chosen to have higher melting point than the processing temperature of the polymers selected to fill the space between the core and inner wire, and also the space between inner armor and outer armor wires. This allows combining the armoring and extrusion process at the same time to stop the armoring process for troubleshooting when needed with no concerns of getting melted and thermally degraded core polymers in the extrusion crosshead.

The key to achieving torque balance between the inner and outer armor wire layers is to size the inner armor wires appropriately to carry their share of the load. Given the likelihood that some minimal amount of stretch may occur, these designs begin with the inner armor wires carrying slightly approximately 60 percent of the load. Any minimal stretch that may occur (which tends to shift load to the outer armor wires) will therefore only tend to slightly improve torque balance between the armor wire layers.

In a torque-balanced cable: $Torque_i = Torque_o$

Where: $Torque_j$=Torque of the inner armor wires; and $Torque_o$=Torque of the outer armor wires.

Torque for a layer of armor wires in a wireline cable can be measured by applying the following equation:

$$Torque = \frac{1}{4} T \times PD \times \sin 2\alpha$$

Where: T=Tension along the direction of the cable; PD=Pitch diameter of the armor wires; and $\alpha$=Lay angle of the wires.

The primary variable to be adjusted in balancing torque values for armor wires applied at different circumferences is the diameter of the wires. The lay angles of the inner and outer armor wires are typically roughly the same, but may be adjusted slightly to optimize torque values for different diameter wires. Because the inner layer of wires has a smaller circumference, the most effective strategy for achieving torque balance is for their individual diameters to be larger than those in the outer layer. Several sample embodiments of torque-balanced, gas-blocking wireline cable designs are described below that apply these principles. In no way do these examples describe all of the possible configurations that can be achieved by applying these basic principles.

A first embodiment is a 0.26±0.02 inch diameter mono/coaxial/triad or other configuration wireline cable with torque balance and gas-blocking design (FIGS. 4A through 4D)—

Figure 4A:
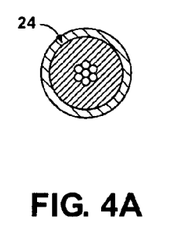
FIGS. 4A through 4D are radial cross-sectional views of a first embodiment wireline mono cable.
Figure 4B:
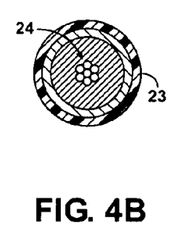
Figure 4C:
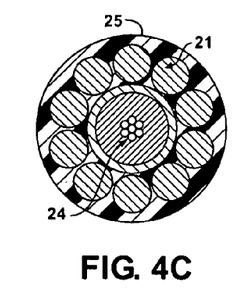
Figure 4D:
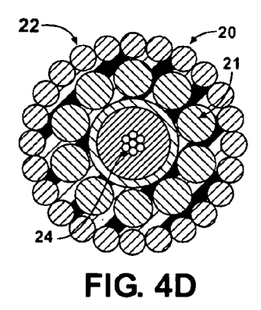
Figure 5A:
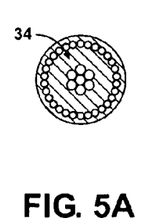
FIGS. 5A through 5D are radial cross-sectional views of a second embodiment wireline coaxial cable.
Figure 5B:
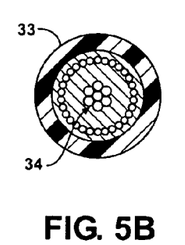
Figure 5C:
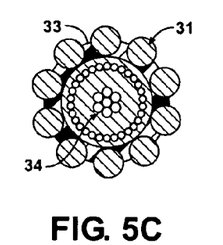
Figure 5D:
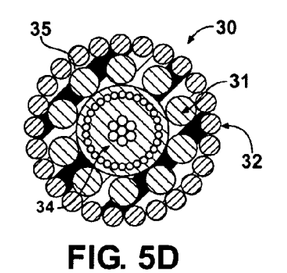
Figure 6A:
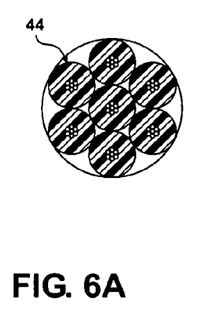
FIGS. 6A through 6D are radial cross-sectional views of a third embodiment wireline hepta cable.
Figure 6B:
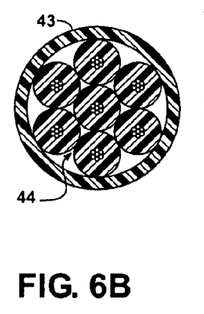
Figure 6C:
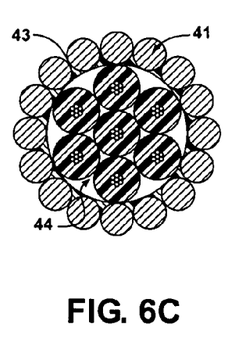
Figure 6D:
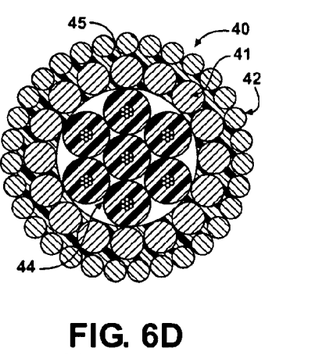

For a mono/coaxial/triad or any other configuration wireline cable 20 with a core diameter of 0.10-0.15 inch and a completed diameter of 0.26±0.02 inch, torque balance could be achieved with inner armor wires 21 of 0.035-0.055 inch diameter and outer armor wires 22 with diameters of 0.020-0.035 inch. The gas blocking is achieved by placing a layer 23 of soft polymer (FIG. 4B) over the cable core 24 (FIG. 4A) before the inner armor wires 21 are cabled over the core (FIG. 4C). The inner armor wires 21 imbed partially into the soft polymer layer 23 such that no gaps are left between the inner armor wires and the cable core. A second layer 25 of soft polymer (FIG. 4C) is optionally extruded over the inner armor wires 21 before the outer armor wires 22 are applied to the cable (FIG. 4D). The second layer 25 of soft polymer fills any spaces between the inner and outer armor wires layers and prevents pressurized gas from infiltrating between the armor wires. By eliminating space for the inner armor wires to compress into the cable core 24, the cable 20 also significantly minimizes cable stretching which helps to further protect the cable against developing torque imbalance in the field. For the values given for this cable, the inner armor wire layer 21 will carry approximately 60% of the load.

A second embodiment is a 0.32±0.02 inch diameter mono/coaxial/hepta or other configuration wireline cable with torque balance and gas-blocking design (FIGS. 5A through 5D)—

For a mono/coaxial/hepta or any other configuration wireline cable 30 with a core diameter of 0.12-0.2 inch and a completed diameter of 0.32±0.02 inch, torque balance could be achieved with inner armor wires 31 of 0.04-0.06 inch diameter and outer wires 32 with diameters of 0.02-0.04 inch. The gas blocking is achieved by placing a layer 33 of soft polymer (FIG. 5B) over the cable core 34 (FIG. 5A) before the inner armor wires are cabled over the core. The inner armor wires 31 imbed partially into the soft polymer layer 33 (FIG. 5C) such that no gaps are left between the inner armor wires and the cable core 34. A second layer 35 of soft polymer (FIG. 5D) is optionally extruded over the inner armor wires 31 before the outer armor wires 32 are applied to the cable 30. The second layer 35 of soft polymer fills any spaces between the inner and outer armor wires layers and prevents pressurized gas from infiltrating between the armor wires. By eliminating space for the inner armor wires to compress into the cable core 34, the cable 30 also significantly minimizes cable stretching which helps to further protect the cable against developing torque imbalance in the field. For the values given for this cable, the inner armor wire layer 31 will carry approximately 60% of the load.

A third embodiment is a 0.38±0.02 inch diameter hepta/triad/quad or any other configuration wireline cable with torque balance and gas blocking (FIGS. 6A through 6D)

For a hepta/triad/quad or any other wireline cable 40 configuration with a core diameter of 0.24-0.29 inch and a completed diameter of 0.38±0.02 inch, torque balance could be achieved with inner armor wires 41 of 0.04-0.06 inch diameter and outer wires 42 with diameters of 0.025-0.045 inch. The gas blocking is achieved by placing a layer 43 of soft polymer (FIG. 6B) over the cable core 44 (FIG. 6A) before the inner armor wires 41 are cabled over the core. The inner armor wires 41 imbed partially into the soft polymer (FIG. 6C) such that no gaps are left between the inner armor wires and the cable core 44. A second layer 45 of soft polymer (FIG. 6D) is optionally extruded over the inner armor wires 41 before the outer armor wires 42 are applied to the cable 40. The second layer 45 of soft polymer fills any spaces between the inner and outer armor wires layers and prevents pressurized gas from infiltrating between the armor wires. By eliminating space for the inner armor wires 41 to compress into the cable core 44, the cable 40 also significantly minimizes cable stretching which helps to further protect the cable against developing torque imbalance in the field. For the values given for this cable, the inner armor wire layer will carry approximately 60% of the load.

A fourth embodiment is a 0.42±0.02 inch diameter hepta/triad/quad or any other configuration wireline cable with torque balance and gas blocking (FIGS. 7A through 7D)

Figure 7A:
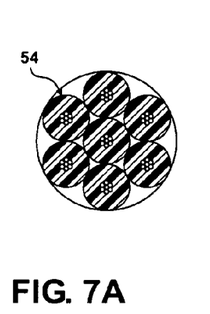
FIGS. 7A through 7D are radial cross-sectional views of a fourth embodiment wireline hepta cable.
Figure 7B:
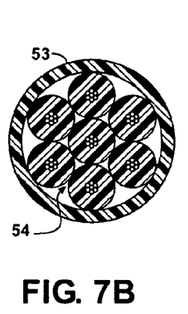
Figure 7C:
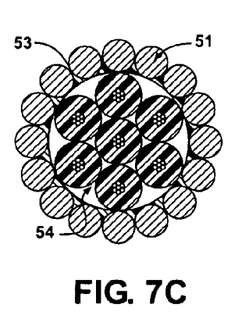
Figure 7D:
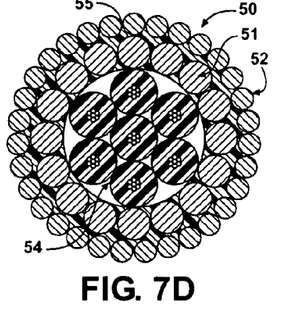

For a hepta/triad/quad or any other wireline cable 50 configuration with a core diameter of 0.25-0.30 inch and a completed diameter of 0.42±0.02 inch, torque balance could be achieved with inner armor wires 51 of 0.04-0.06 inch diameter and outer armor wires 52 with diameters of 0.025-0.045 inch. The gas blocking is achieved by placing a layer 53 of soft polymer (FIG. 7B) over the cable core 54 (FIG. 7A) before the inner armor wires 51 are cabled over the core (FIG. 7C). The inner armor wires 51 imbed partially into the soft polymer layer 53 such that no gaps are left between the inner armor wires and the cable core 54. A second layer 55 of soft polymer (FIG. 7D) is optionally extruded over the inner armor wires 51 before the outer armor wires 52 are applied to the cable 50. The second layer 55 of soft polymer fills any spaces between the inner and outer armor wires layers and prevents pressurized gas from infiltrating between the armor wires. By eliminating space for the inner armor wires 51 to compress into the cable core 54, the cable 50 also significantly minimizes cable stretching which helps to further protect the cable against developing torque imbalance in the field. For the values given for this cable, the inner armor wire layer will carry approximately 60% of the load.

A fifth embodiment is a 0.48±0.02 inch diameter hepta/triad/quad or any other configuration wireline cable with torque balance and gas blocking (FIGS. 8A through 8D)

Figure 8A:
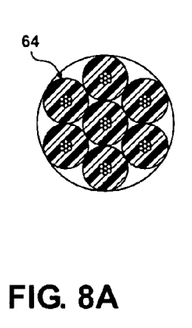
FIGS. 8A through 8D are radial cross-sectional views of a fifth embodiment wireline hepta cable.
Figure 8B:
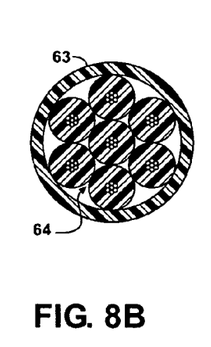
Figure 8C:
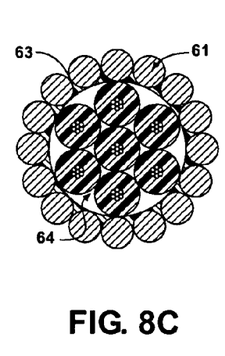
Figure 8D:
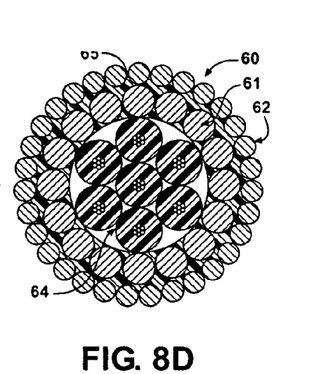

For a hepta/triad/quad or any other wireline cable 60 configuration with a core diameter of 0.20-0.35 inch and a completed diameter of 0.48±0.02 inch, torque balance could be achieved with inner armor wires 61 of 0.05-0.07 inch diameter and outer armor wires 62 with diameters of 0.03-0.05 inch. The gas blocking is achieved by placing a layer 63 of soft polymer (FIG. 8B) over the cable core 64 (FIG. 8A) before the inner armor wires 61 are cabled over the core (FIG. 8C). The inner armor wires 61 imbed partially into the soft polymer layer 63 such that no gaps are left between the inner armor wires and the cable core 64. A second layer 65 of soft polymer (FIG. 8D) is optionally extruded over the inner armor wires 61 before the outer armor wires 62 are applied to the cable 60. The second layer 65 of soft polymer fills any spaces between the inner and outer armor wires layers and prevents pressurized gas from infiltrating between the armor wires. By eliminating space for the inner armor wires 61 to compress into the cable core 64, the cable 60 also significantly minimizes cable stretching which helps to further protect the cable against developing torque imbalance in the field. For the values given for this cable, the inner armor wire layer will carry approximately 60% of the load.

A sixth embodiment is a 0.52±0.02 inch diameter hepta cable with torque-balanced, gas-blocking design (FIGS. 9A through 9D)—

Figure 9A:
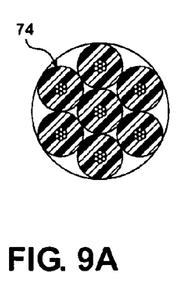
FIGS. 9A through 9D are radial cross-sectional views of a sixth embodiment wireline hepta cable.
Figure 9B:
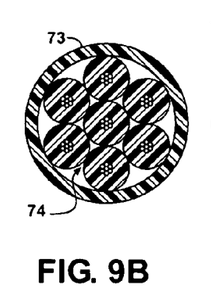
Figure 9C:
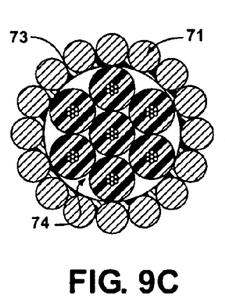
Figure 9D:
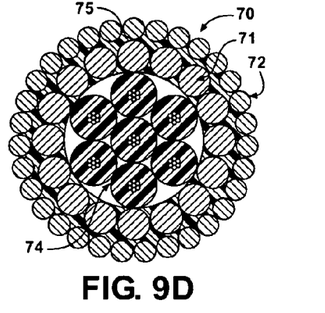

For a hepta cable 70 with a core diameter of 0.25-0.40 inch and a completed diameter of 0.52±0.02 inch, torque balance could be achieved with inner armor wires 71 of 0.05-0.07 inch diameter and outer armor wires 72 with diameters of 0.03-0.05 inch. The gas blocking is achieved by placing a layer 73 of soft polymer (FIG. 9B) over the cable core 74 (FIG. 9A) before the inner armor wires 71 are cabled over the core (FIG. 9C). The inner armor wires 71 imbed partially into the soft polymer layer 73 such that no gaps are left between the inner armor wires and the cable core 74. A second layer 75 of soft polymer (FIG. 9D) is optionally extruded over the inner armor wires 71 before the outer armor wires 72 are applied to the cable 70. The second layer 75 of soft polymer fills any spaces between the inner and outer armor wires layers and prevents pressurized gas from infiltrating between the armor wires. By eliminating space for the inner armor wires 71 to compress into the cable core 74, the cable 70 also significantly minimizes cable stretching which helps to further protect the cable against developing torque imbalance in the field. For the values given for this cable, the inner armor wire layer will carry approximately 60% of the load.

A seventh embodiment includes an optional stranded wire outer armoring (FIG. 10)—

Figure 10:
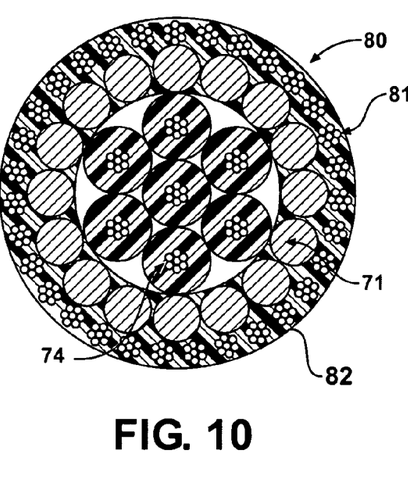
FIG. 10 is a radial cross-sectional view of a seventh embodiment wireline cable.

As an option in any of the embodiments described above, the outer layer of solid armor wires may be replaced with similarly sized stranded wires 81 in a wireline cable 80 as shown in FIG. 10. If a stranded wire is used on the outside, a jacket 82 is put over the top of the stranded wires 81 and bonded to the inner jacket between the stranded wires in order not to expose the small individual elements directly to well bore conditions of abrasion and cutting.

An eighth embodiment includes an outer, easily sealed polymeric jacket (FIG. 11)—

Figure 11:
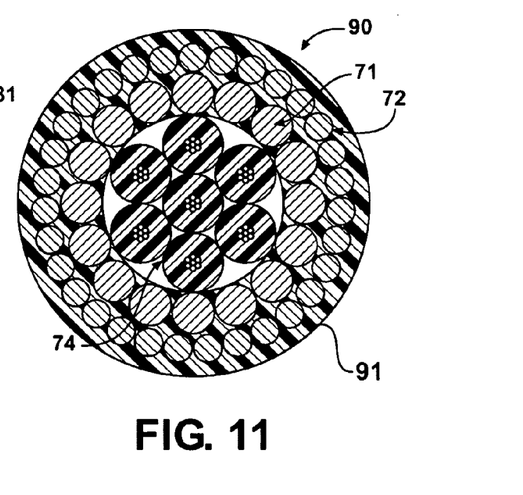
FIG. 11 is a radial cross-sectional view of an eighth embodiment wireline cable.

To create torque-balanced, gas-sealed cables that are also more easily sealed by means of a rubber pack-off instead of pumping grease through flow tubes at the well surface, any of the above embodiments may be provided with an outer polymeric jacket 91. To continue the gas-sealed capabilities to the outer diameter of the cable 90, this polymeric material must be bondable to the other jacket layers. For example (as shown in FIG. 11), an outer jacket 91 of carbon-fiber-reinforced ETFE (ethylene-tetrafluoroethylene) fluoropolymer may be applied over the outer armor wire layer 72, bonding through the gaps in the outer strength members. This creates a totally bonded jacketing system and with the addition of the fiber-reinforced polymer, also provides a more durable outer surface. For this, the polymer that is placed between the inner and outer armor layers needs to bond to the jacket placed on top of the outer armor wires 72 through the gap in the outer armor wires.

Figure 12:
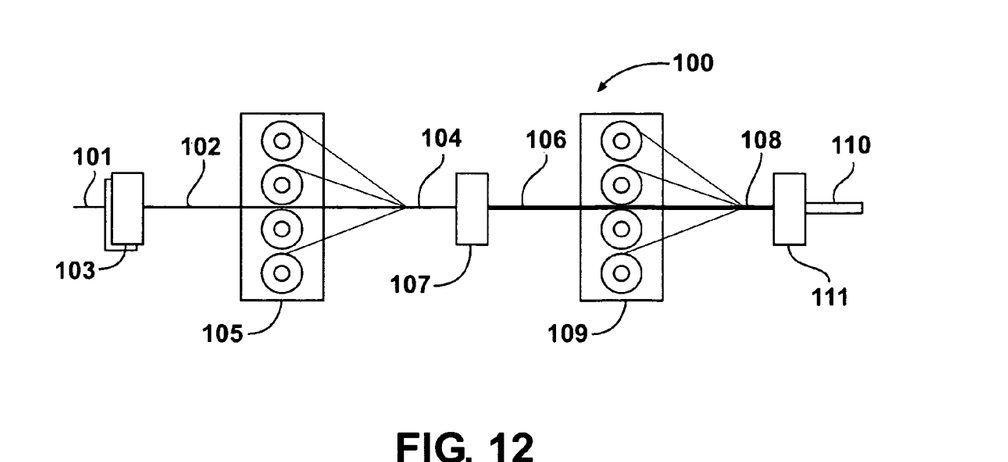
FIG. 12 is a schematic representation of a manufacturing line for constructing wireline cable.

In any of the above-described embodiments, polymers for the armor-jacketing layers may be chosen with significantly lower process temperatures (25° F. to 50° F. lower) than the melting point of polymers used in the cable core. This enables the armoring process to be stopped and started during armoring without the risk that prolonged exposure to extruding temperatures will damage the cable core. This on-line process is as follows with reference to a schematic representation of a wireline cable manufacturing line 100 shown in FIG. 12:

A cable core 101 enters the armoring process line 100 at the left in FIG. 12.

A layer of soft polymer 102 is extruded over the cable core 101 in a first extrusion station 103. The soft outer polymer allows for better and more consistent embedding of the armor wires into the polymer. In case that the cable core 101 needs to be protected during the armoring process or harsh field operation, dual layers of hard and soft polymers can be co-extruded over the cable core. A hard polymer layer placed underneath a soft polymer layer is mechanically resistant so that such a layer could prevent armor wires from breaking into the cable core through the soft layer. Alternatively this layer could be extruded prior to the armoring process.

An inner armor wire layer 104 is cabled helically over and embedded into the soft polymer 102 at a first armoring station 105. While armoring, any electromagnetic heat source such as infrared waves, ultrasonic waves, and microwaves may be used to further soften the polymers to allow the armoring line 100 to be run faster. This could be applied before the armor hits the core or after the armor touches the core.

A second layer 106 of soft polymer is extruded over the embedded inner layer 104 of armor wires at a second extrusion station 107.

An outer armor wire layer 108 is cabled (counterhelically to the inner armor wire layer 104) over and embedded into the soft polymer 106 at a second armoring station 109. While armoring, any electromagnetic heat source such as infrared waves, ultrasonic waves, and microwaves may be used to further soften polymers to allow the armoring line 100 to be run faster. This could be applied before the armor hits the core or after the armor touches the core.

If needed, a final layer 110 of hard polymer is extruded over the embedded outer armor wire layer 108 at a third extrusion station 111 to complete the cable as described above.

Although the on-line combined process as described is preferred to save a significant amount of manufacturing time, each step of the process can be separated for accommodation of process convenience.

The particular embodiments disclosed above are illustrative only, as the invention may be modified and practiced in different but equivalent manners apparent to those skilled in the art having the benefit to the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values. Accordingly, the protection sought herein is as set forth in the claims below.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A cable, comprising:
an electrically conductive cable core for transmitting electrical power; a hard polymer layer surrounding said cable core, and a first layer of polymer surrounding said hard polymer layer, wherein the cable core has a core diameter of from 0.25 inch to 0.40 inch, and wherein the cable has a completed diameter of from 0.50 inch to 0.54 inch;
an inner layer of a plurality of first armor wires surrounding said cable core, said first armor wires being imbedded in said first layer of polymer to prevent gaps between said first armor wires and said cable core; and
an outer layer of a plurality of second armor wires surrounding said inner layer, said second armor wires having a smaller diameter than a diameter of said first armor wires for preventing torque imbalance in the cable, wherein the diameter of armor wires in the inner layer are from 0.05 inch to 0.07 inch and the diameter of armor wires in the outer layer are from 0.03 inch to 0.05 inch.

2. The cable of claim 1 wherein said first armor wires carry approximately 60% of a load applied to the cable.

3. The cable of claim 1 including a second layer of polymer material surrounding said inner layer, said outer layer surrounding said second layer.

4. The cable of claim 3 including a third layer of polymer material surrounding said outer layer.

5. The cable of claim 1 wherein said second armor wires are stranded wires.

6. The cable of claim 1 wherein said polymer material of said first layer is formed from at least one of: a polyolefin or olefin-base elastomer material; a thermoplastic vulcanizate material; a silicone rubber; an acrylate rubber; a soft engineering plastic; a soft fluoropolymer material; a fluoroelastomer material; and a thermoplastic fluoropolymer material.

7. The cable of claim 1 wherein any stretch on the cable shifts load to the second armor wires and thereby improves a torque balance between the armor wire layers.

8. A cable, comprising:
an electrically conductive cable core for transmitting electrical power;
a first layer of polymer disposed about a hard polymer layer surrounding the cable core, wherein the cable core has a core diameter of from 0.25 inch to 0.40 inch, and wherein the cable has a completed diameter of from 0.50 inch to 0.54 inch;
an inner layer of a plurality of first armor wires surrounding said cable core, said first armor wires being imbedded in said first layer to prevent gaps between said first armor wires and said cable core;
a second layer of polymer material surrounding said inner layer; and
an outer layer of a plurality of second armor wires surrounding said second layer, said second layer preventing gaps between said first armor wires and said second armor wires, said second armor wires having a smaller diameter than a diameter of said first armor wires for preventing torque imbalance in the cable, wherein the diameter of armor wires in the inner layer are from 0.05 inch to 0.07 inch and the diameter of armor wires in the outer layer are from 0.03 inch to 0.05 inch; and wherein said first armor wires and said second armor wires have an equal lay angle.

9. The cable of claim 8 wherein said first armor wires carry approximately 60% of a load applied to the cable.

10. The cable of claim 8 including a third layer of polymer material surrounding said outer layer.

11. The cable of claim 8 wherein said second armor wires are stranded wires.

12. The cable of claim 8 wherein said polymer materials of said first and second layers are formed from at least one of: a polyolefin or olefin-base elastomer material; a thermoplastic vulcanizate material; a silicone rubber; an acrylate rubber; a soft engineering plastic; a soft fluoropolymer material; a fluoroelastomer material; and a thermoplastic fluoropolymer material.

13. The cable of claim 8 wherein any stretch on the cable shifts load to the second armor wires and thereby improves a torque balance between the armor wire layers.

* * * * *